United States Patent Office 2,909,488
Patented Oct. 20, 1959

2,909,488

NUCLEAR REACTOR COOLANT

Eugene L. Colichman, Los Angeles, Calif., assignor, by mesne assignments, to the United States of America as represented by the United States Atomic Energy Commission No Drawing. Application July 13, 1954
Serial No. 443,133

6 Claims. (Cl. 252—74)

The present invention concerns the formulation of a new and novel reactor coolant. More specifically, the invention is directed both to the formulation of specific reactor coolants as well as methods of inhibiting the polymerization of organic nuclear coolants, giving high pyrolitic and radiation stability to the coolant, and to methods of cooling a nuclear reactor.

Various organic compounds have been suggested for use as the primary or secondary coolant in a nuclear reactor. Although the heat exchange characteristics of these coolants are satisfactory, their use has been severely limited due to low pyrolitic and radiation stabilities. Heretofore, no practical solution has been suggested to prevent the simultaneous polymerization of the dissociation products (resulting from pyrolitic and radiolitic decomposition) of a reactor coolant during operation, or to increase the over-all stability of the reactor coolant. The alpha, beta, gamma, fast neutron and other radiation energies emitted from the nuclear reactor have been found to have a definite tendency to cause formation of organo free radicals in the coolant presumably due to a cleavage of the ring structure of the organic coolant. It has been determined that the addition or dispersion of certain metals to the organic coolant will enable the organo free radicals to react with these metallic elements. During the irradiation of the coolant in the reactor, the dispersed metal will form organometallic compounds within the organic-metal dispersion. A mixture of particular organic coolants and the proper metal when heated and irradiated will form organometallic compounds in the mixture and will considerably increase the efficiency and stability of the reactor coolant.

When an organic compound is used as a secondary coolant (i.e., not in a direct heat transfer relation with the reactor core) it will be subjected to high temperatures (400–1000° F.) and gamma radiation. If it were assumed that sodium was the primary coolant the gamma radiation could be from $Na^{24}$ decay having an activity of $10^{13}$ to $10^{15}$ disintegrations/sec. cc. When primary coolant usage is contemplated the organic coolant will be subjected to fast neutron fluxes ($1 \times 10^{12}$ to $2 \times 10^{13}$ neutrons/sec. cm.$^2$), thermal neutron fluxes $5 \times 10^{12}$ to $1 \times 10^{14}$ neutrons/sec. cm.$^2$), and gamma activity ($1 \times 10^{11}$ to $1 \times 10^{13}$ mev./sec. cc.) at temperatures of 400–1000° F. For shield applications the organic coolant will be subjected to small fluxes of fast neutrons and gamma rays.

It is therefore an object of this invention to provide a new and novel organic nuclear coolant.

A further object of this invention is to provide a hydrocarbon coolant having high stability and efficiency within a nuclear reactor.

A still further object of this invention is to provide an organic coolant of the hydrocarbon type having improved thermal conductivity.

Another object of this invention is to provide a mixture of a dispersed metal and an organic hydrocarbon usable as a nuclear reactor coolant.

A further object of this invention is to provide a method of inhibiting the polymerization of a hydrocarbon coolant during operation in a nuclear reactor.

A still further object of this invention is to provide a method of making an aromatic hydrocarbon nuclear reactor coolant more stable under conditions of operation in the nuclear reactor.

An additional object of this invention is to provide a method of cooling a nuclear reactor in which a metal is dispersed within an organic hydrocarbon coolant.

The above objects as well as other objects of the invention will become apparent from the following description.

Organic coolants used in nuclear reactors are subjected to both pyrolitic and radiation decomposition when such coolant is used in an operating reactor. In order to enhance the operating range, stability and workability of such coolants it has been desired to prevent or suppress polymerization resulting from the pyrolitic and radiation decomposition. The present invention provides a means for the formation of various organometallic compounds within the operating coolant due to the presence of a dispersed metal within the coolant.

Three main disadvantages are apparent to the use of a combination of organic hydrocarbons and metals in reactor coolant formulations. First of all, it is extremely difficult to obtain a homogeneous dispersion of a usually dense molten metal in a much less dense hydrocarbon. Next, most metals employed have high or relatively high neutron capture cross sections which allow formation of undesirable radioactive isotopes and large amounts of radioactivity in the system. Lastly, the use of liquid metals brings forth a difficult and severe corrosion problem in the design of a cooling system. It has been found that each of these difficulties is minimized by the instant invention wherein a light alkaline earth metal, in a finely divided condition, is dispersed within the hydrocarbon reactor coolant. The light alkaline earth metals applicable to the instant invention are beryllium and magnesium. Since the aromatic hydrocarbons used as nuclear coolants have operating ranges from 100 to 500° C., neither beryllium nor magnesium with melting points of 1350° C. and 651° C., respectively, would become molten. Furthermore, beryllium and magnesium have densities of 1.85 and 1.74, respectively, and would be easily retained as dispersions in the hydrocarbon coolant. Likewise, the neutron capture cross section of beryllium and magnesium are relatively low, having values of 0.010 and 0.059 barn, respectively. These properties tend to nullify or minimize the three main disadvantages mentioned above.

As stated above, it is known that the pyrolitic and radiation effect in a nuclear reactor acts to cleave the bonds between the basic ring structure of the hydrocarbon coolant and the radicals attached thereto. This action forms primary dissociation free radical products which under normal conditions will link to each other forming complex organic chains which lead to the polymerization or condensation of these products into unwanted and unworkable polymers or resins. The pyrolitic and radiation effects in the nuclear reactor promote the formation of organo free radicals in the coolant. The presence of either beryllium or magnesium dispersed within the operating coolant will enable these metals to react with the organo free radicals to form aryl beryllium and aryl magnesium compounds. The combination of an aromatic hydrocarbon and a dispersed metal powder therein will increase the pyrolitic and radiation stability of the over-all coolant, inhibit the high polymer formation, and improve the thermal conductivity of the coolant as compared to the aromatic hydrocarbon when used alone.

The new and novel reactor coolant comprises particular types of organic compounds coupled with particular metals. It has been determined that aromatic hydrocarbons should be used as base materials for the coolant due to their stability when subjected to pyrolitic and radiation effects. The applicable hydrocarbons are the polyphenyls and the condensed ring compounds. Specifically, biphenyl, ortho, meta, or para-terphenyl and the quaterphenyls may be given as examples of the polyphenyls used, while naphthalene, anthracene, and phenanthrene may be given as examples of the condensed ring compounds. The operating range of the above hydrocarbon coolants may generally be given as from 100° to 500° C. The above hydrocarbons have melting points which enable them to be in the liquid state in this range. For example, meta-terphenyl melts at approximately 87° C., para-terphenyl melts at 213° C., and p-quaterphenyl melts at a value over 300° C.

Specific formulations of coolant may be made using the above hydrocarbons and beryllium and/or magnesium powders. The metal powders, which are pyrophoric in an oxidizing atmosphere, may be added to the coolant as an additive in the amounts of from 0.1 to 5%. These percentages of metal in the coolant make available sufficient metal to form organometallic compounds with the organo free radicals formed by the pyrolitic and radiation decomposition of the organic material. The metal powders used must be of such particle size that they stay evenly dispersed within the circulating coolant mixture.

The following is given as an example of practicing the instant invention. Approximately 2% of beryllium powder is added to para-terphenyl (98%), and such coolant with the beryllium powder dispersed therein is circulated within the nuclear reactor coolant system. The circulating coolant is subjected to irradiation within the operating nuclear reactor. This new and novel reactor coolant additive is usable to inhibit the polymerization of and to stabilize the hydrocarbon coolant. The radiation energies promote the formation of aryl organo free radicals which then react with the beryllium powder particles forming organo-metallics such as aryl beryllium compounds. A new method of cooling a nuclear reactor is thus provided. These methods and this particular formulation will operate in the 213–500° C. range due to the 213° C. melting point of para-terphenyl and the formation of the inhibiting organo-metallic compounds in this range.

Although the invention has been described in detail, it is to be clearly understood that the same is by way of example only and is not to be taken by way of limitation, the spirit and scope of this invention being limited only by the terms of the appended claims.

I claim:

1. A nuclear reactor coolant composition consisting essentially of at least one aromatic hydrocarbon selected from the class consisting of polyphenyls and condensed ring compounds having from 2 to about 4 carbon rings, and dispersed therein a metal selected from the group consisting of beryllium and magnesium.

2. The composition of claim 1 in which the dispersed metal is beryllium.

3. The composition of claim 1 in which the dispersed metal is magnesium.

4. A nuclear reactor coolant composition consisting essentially of at least one polyphenyl hydrocarbon compound having from 2 to about 4 phenyl rings and dispersed therein from about 0.1 to about 5% of a metal selected from the class consisting of beryllium and magnesium.

5. A nuclear reactor coolant consisting essentially of terphenyl and dispersed therein from about 0.1 to about 5.0% magnesium powder.

6. A nuclear reactor coolant consisting essentially of terphenyl and dispersed therein from about 0.1 to about 5.0 percent beryllium powder.

References Cited in the file of this patent

UNITED STATES PATENTS

| | | |
|---|---|---|
| 1,733,620 | Morrell | Oct. 29, 1929 |
| 1,762,547 | Churchill | June 10, 1930 |
| 2,013,152 | Hoyt | Sept. 3, 1935 |
| 2,642,345 | Bradley et al. | June 16, 1953 |
| 2,743,223 | McClinton et al. | Apr. 24, 1956 |

FOREIGN PATENTS

| | | |
|---|---|---|
| 697,601 | Great Britain | Sept. 23, 1953 |

OTHER REFERENCES

Chem. Rev. 31 (1942), an article by H. I. Schlesinger and A. B. Burg, page 37.